(12) United States Patent
Free et al.

(10) Patent No.: US 12,061,709 B2
(45) Date of Patent: Aug. 13, 2024

(54) SYSTEMS AND METHODS FOR CONDUCTING DATA EXTRACTION USING DEDICATED DATA EXTRACTION DEVICES

(71) Applicant: Palantir Technologies Inc., Palto Alto, CA (US)

(72) Inventors: Jason Free, Arlington, VA (US); Charles Walters, Arlington, VA (US); Claude Johnson, Foster City, CA (US); Stephen Denney, Flagstaff, AZ (US); Drew Tuck, Mountain View, CA (US); Jerry Sung, San Mateo, CA (US); Daniel Berkowitz, New York, NY (US); Quinn Beightol, New York, NY (US); Melvin Shaw, Washington, DC (US); Charles Smith, Los Altos, CA (US)

(73) Assignee: Palantir Technologies Inc., Denver, CO (US)

( * ) Notice: Subject to any disclaimer, the term of this patent is extended or adjusted under 35 U.S.C. 154(b) by 1038 days.

(21) Appl. No.: 16/674,164

(22) Filed: Nov. 5, 2019

(65) Prior Publication Data
US 2021/0034767 A1 Feb. 4, 2021

Related U.S. Application Data

(60) Provisional application No. 62/881,494, filed on Aug. 1, 2019.

(51) Int. Cl.
*G06F 21/60* (2013.01)
*G06F 8/61* (2018.01)
*G06F 21/62* (2013.01)

(52) U.S. Cl.
CPC .............. *G06F 21/604* (2013.01); *G06F 8/61* (2013.01); *G06F 21/6218* (2013.01)

(58) Field of Classification Search
CPC ..... H04L 67/1097; H04L 67/04; H04L 67/12; H04L 67/10; H04L 67/34; H04L 67/53;
(Continued)

(56) References Cited

U.S. PATENT DOCUMENTS 10,133,782 B2 * 11/2018 Pryce ..................... G06F 16/254
10,516,981 B1 * 12/2019 Lingle ..................... H04L 67/10
(Continued)

FOREIGN PATENT DOCUMENTS

EP 20186609 A1 7/2020
WO 2009114436 A2 9/2009

*Primary Examiner* — Tae K Kim
(74) *Attorney, Agent, or Firm* — Faegre Drinker Biddle & Reath LLP—Palantir

(57) ABSTRACT

A computing device, such as a server, has a sealed housing and runs one or more data extraction agents. In some embodiments, the computing device includes one or more processors and memory located inside the sealed housing, the memory stores instructions that when executed by the one or more processors causes the one or more processors to: authenticate with a data recipient system using a prestored security engine and using a shared registration secret uniquely associating the computing device with the data recipient system; retrieve an extraction job specification from an extraction job specification repository associated with the data recipient system; and using the extraction job specification, communicate to one or more client computing devices associated with a client system to extract data records from one or more data stores of the client system. Related methods are also disclosed.

20 Claims, 5 Drawing Sheets

(58) Field of Classification Search
CPC ..... H04L 67/56; H04L 67/566; H04L 67/567; H04L 67/562; H04L 63/0272; H04L 63/029; H04L 12/4641; H04L 12/4633; H04L 43/103; H04L 43/10; H04L 43/12; H04L 43/20
See application file for complete search history.

(56) References Cited

U.S. PATENT DOCUMENTS

| | | | |
|---|---|---|---|
| 10,848,988 B1* | 11/2020 | Rahman | H04L 41/5025 |
| 2003/0051163 A1* | 3/2003 | Bidaud | G06F 21/577 |
| | | | 726/25 |
| 2006/0064459 A1 | 3/2006 | Matsushima | |
| 2007/0028110 A1* | 2/2007 | Brennan | H04L 63/18 |
| | | | 713/176 |
| 2009/0018672 A1* | 1/2009 | Gienke | H04L 43/00 |
| | | | 709/224 |
| 2010/0097940 A1* | 4/2010 | Asefa | H04L 43/0811 |
| | | | 370/245 |
| 2010/0100735 A1* | 4/2010 | Rajan | H04W 12/068 |
| | | | 713/168 |
| 2010/0281248 A1* | 11/2010 | Lockhart | G06F 11/3612 |
| | | | 713/150 |
| 2011/0047597 A1* | 2/2011 | Mahaffey | H04L 63/10 |
| | | | 709/219 |
| 2012/0054563 A1* | 3/2012 | Diab | H04L 41/22 |
| | | | 714/E11.145 |
| 2012/0252405 A1* | 10/2012 | Lortz | H04W 4/50 |
| | | | 455/410 |
| 2012/0266209 A1* | 10/2012 | Gooding | H04L 63/20 |
| | | | 726/1 |
| 2012/0317276 A1* | 12/2012 | Muniraju | H04L 41/14 |
| | | | 709/224 |
| 2014/0304294 A1* | 10/2014 | Sharma | G06F 16/172 |
| | | | 707/769 |
| 2014/0366155 A1* | 12/2014 | Chang | H04L 67/1097 |
| | | | 726/27 |
| 2015/0031332 A1* | 1/2015 | Clark | H04W 12/12 |
| | | | 455/411 |
| 2015/0281355 A1* | 10/2015 | Maturana | G06F 9/548 |
| | | | 709/202 |
| 2016/0098388 A1* | 4/2016 | Blevins | G06F 16/258 |
| | | | 707/755 |
| 2016/0191483 A1* | 6/2016 | Larson | H04L 63/08 |
| | | | 713/168 |
| 2016/0205129 A1* | 7/2016 | Webb | H04L 63/029 |
| | | | 726/1 |
| 2016/0314302 A1* | 10/2016 | Sabetta | G06F 21/577 |
| 2016/0381080 A1* | 12/2016 | Reddem | H04L 63/205 |
| | | | 726/1 |
| 2017/0249132 A1* | 8/2017 | Andrews | H04L 63/062 |
| 2017/0351879 A1* | 12/2017 | Sion | H04L 9/3226 |
| 2018/0004953 A1* | 1/2018 | Smith, II | H04L 9/3268 |
| 2018/0032575 A1* | 2/2018 | Pryce | G06F 16/2455 |
| 2018/0032706 A1* | 2/2018 | Fox | H04L 67/146 |
| 2018/0049051 A1* | 2/2018 | Doshi | H04L 41/145 |
| 2018/0124158 A1* | 5/2018 | Amento | H04L 67/63 |
| 2019/0121343 A1* | 4/2019 | Cella | G01M 13/028 |
| 2019/0123983 A1* | 4/2019 | Rao | H04L 43/062 |
| 2019/0156041 A1* | 5/2019 | Levy | G06F 21/577 |
| 2019/0174207 A1* | 6/2019 | Cella | H04Q 9/00 |
| 2019/0190921 A1* | 6/2019 | Rieser | G06F 16/90335 |
| 2019/0260794 A1* | 8/2019 | Woodford | H04L 63/0209 |
| 2019/0261203 A1* | 8/2019 | Raleigh | H04W 24/08 |
| 2019/0297160 A1* | 9/2019 | Harriman | G06F 9/4856 |
| 2020/0167205 A1* | 5/2020 | Guim Bernat | G06F 9/5094 |
| 2020/0177704 A1* | 6/2020 | Nucci | H04L 67/34 |
| 2020/0233955 A1* | 7/2020 | Ramzan | G06F 21/554 |
| 2020/0296139 A1* | 9/2020 | Fainberg | H04L 63/205 |
| 2020/0310394 A1* | 10/2020 | Wouhaybi | H04L 67/125 |
| 2020/0342096 A1* | 10/2020 | Ford | H04L 67/535 |
| 2020/0356674 A1* | 11/2020 | Nikolai | G06F 21/577 |
| 2021/0097108 A1* | 4/2021 | Goyal | G06F 16/90335 |
| 2022/0197773 A1* | 6/2022 | Butler | G06F 9/5038 |

* cited by examiner

SYSTEMS AND METHODS FOR CONDUCTING DATA EXTRACTION USING DEDICATED DATA EXTRACTION DEVICES

1. CROSS REFERENCE TO RELATED APPLICATIONS

This application claims priority to U.S. Provisional Application No. 62/881,494, filed Aug. 1, 2019, incorporated by reference herein for all purposes.

2. BACKGROUND

Certain embodiments of the present disclosure are directed to systems and methods for extracting data records. More particularly, some embodiments of the present disclosure provide systems and methods for deploying components of data extraction systems inside a client firewall.

As data analytics and business intelligence move to cloud-based systems, enterprises may have data sources and systems inside their security boundary that need to be shared with cloud systems, such as cloud-based data analytic platforms. For example, varying types of data sources include data records that need to be extracted for use by cloud-based data analytic platforms. However, for compliance and policy reasons, it may be untenable for enterprises to open their security boundary to inbound traffic from the internet or a dynamic range of cloud addresses.

Current implementations of data extraction components, such as data extraction agents used as part of cloud-based data analytic systems, are inside a security boundary of enterprises on the client devices and the data extraction agent shares the operating system of client systems. Also, setup of data extraction agents can be time consuming and require security holes through client firewalls to be opened to allow installation and use of the data extraction agent within the client systems. The client firewalls also may not be able to enforce their standard security policies on the data being pushed out to the cloud.

Hence it is highly desirable to improve techniques for providing data extraction agents for enterprises that allow data analytics platforms to access client system data sources.

3. SUMMARY

Certain embodiments of the present disclosure are directed to a dedicated data extraction computing device (e.g., a hardware appliance such as a server) that is sealed and can be inserted at a client data center. In some embodiments, the dedicated data extraction computing device sits between the client devices and inside the client firewall. In certain embodiments the dedicated data extraction computing device has its own prestored thin operating system (e.g., a thin LINUX OS) and security engine and authenticates with a data recipient system, such as a cloud-based data analytics system, using the prestored security engine and using a shared registration secret uniquely associating the dedicated data extraction computing device with the data recipient system (e.g., cloud system). In some embodiments, the security engine provides initial security hardening for the thin OS of the data extraction appliance. The security engine can also be configured to provide one or more of continuous enforcement of the security hardening, automated remediation of security vulnerabilities, and audit and access logging. The dedicated data extraction computing device effectively extends the cloud system's edge into the enterprise's existing network and the enterprise can use existing security practices in an enterprise firewall, such as deep packet inspection and data loss prevention to ensure security policy compliance. In some embodiments, the dedicated data extraction computing device includes a menu driven installation and data extraction management user interface that a client administrator can operate and provides secure download of a data extraction agent bundle. In certain embodiments, the user interface also provides client control of data extraction stoppage of access to client data stores.

In certain embodiments, a computing device has a sealed housing and runs one or more data extraction agents. In some embodiments, the computing device includes one or more processors and memory located inside the sealed housing, the memory storing instructions that when executed by the one or more processors causes the one or more processors to: authenticate with a data recipient system using a prestored security engine and using a shared registration secret uniquely associating the computing device with the data recipient system; retrieve an extraction job specification from an extraction job specification repository associated with the data recipient system; using the extraction job specification, communicate to one or more client computing devices associated with a client system to extract data records from one or more data stores of the client system; receive extracted data records from the one or more client computing devices; and send the received extracted data records to the data recipient system.

According to some embodiments, a method for conducting data extraction from one or more data stores associated with a client system includes authenticating with a data recipient system using a prestored security engine in a dedicated data extraction computing device and using a shared registration secret uniquely associating the dedicated data extraction computing device with the data recipient system. In certain embodiments, the methods include retrieving, by the dedicated data extraction computing device, an extraction job specification from an extraction job specification repository associated with the data recipient system and using the extraction job specification, communicating by the dedicated data extraction computing device, to one or more client computing devices associated with the client system to extract data records from the one or more data stores. In some embodiments, the methods include receiving, by the dedicated data extraction computing device, extracted data records from the one or more client computing devices and sending the received extracted data records to the data recipient system, wherein the method is performed using one or more processors of the dedicated data extraction computing device.

According to certain embodiments, a system includes a device comprising a sealed housing; and one or more processors and memory located inside the sealed housing, the memory storing instructions that when executed by the one or more processors causes the one or more processors to: use a prestored operating system (OS) resident on the computing device to employ a prestored data extraction agent installation interface to configure a data extraction agent, the data extraction agent operative to: securely interface with one or more client computing devices in a client system and interface with a firewall device in the client system; poll for one or more data extraction jobs from the data recipient system through the firewall device; in response to polling for the one or more data extraction jobs from the data recipient system, extract data from one or more data stores of the client system; and provide the extracted data obtained from the client system to the data recipient system through the firewall device.

Depending upon the embodiment, one or more benefits may be achieved. These benefits and various additional benefits can be fully appreciated with reference to the detailed description and accompanying drawings that follow.

4. BRIEF DESCRIPTION OF THE DRAWINGS

The implementations will be more readily understood in view of the following description when accompanied by the below figures, wherein like reference numerals represent like elements, and wherein.

5. DETAILED DESCRIPTION

Figure 1:
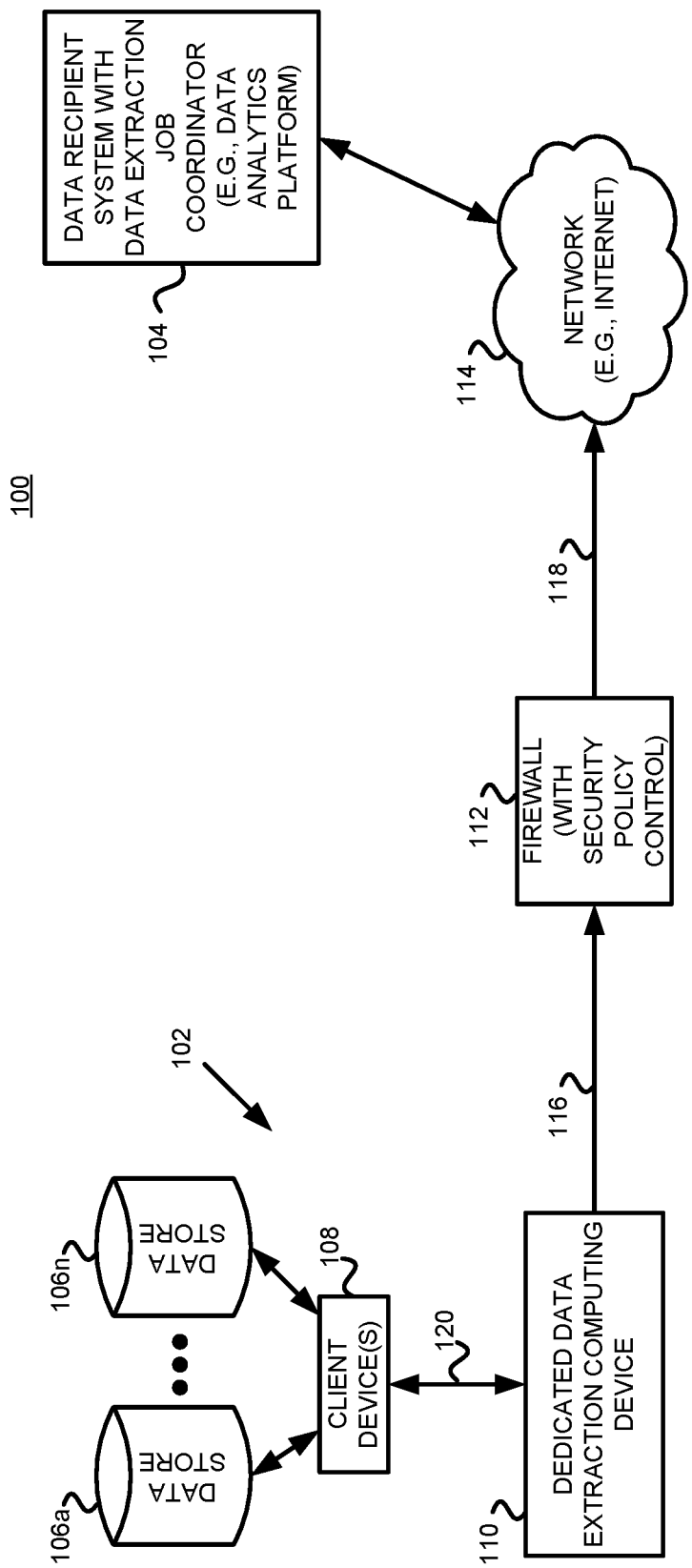
FIG. 1 is a block diagram illustrating a data extraction system in accordance with one example set forth in the disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Aspects of the subject technology are directed to systems and methods for conducting data extraction using a dedicated data extraction device. In certain embodiments the dedicated data extraction device is a physically separate device from the client computing devices (e.g., client system but may be located in the same data center as client devices) and in some examples does not share an operating system with the client system. In certain examples, a dedicated data extraction computing device is shipped with at least its own dedicated thin operating system (OS), a security engine and a prestored data extraction agent installation interface. In certain examples, the data extraction agent installation interface includes a menu driven installation and data extraction management user interface (UI) that a client administrator can operate. In some examples, the UI provides secure download of the data extraction agent bundle and client control of data extraction stoppage of client repositories.

In some examples, the dedicated data extraction computing device, once registered, has a primary function of performing data extraction from the client system and pushes extracted data out to the cloud. In certain examples the dedicated data extraction computing device is trusted since it is uniquely linked to the data recipient system via a shared secret key. In some examples, the data extraction agent is also trusted since it authenticates with the data recipient system using public key infrastructure (PKI) certificates sent in the bundle using prestored security services in the computing device.

In some embodiments, benefits include significant improvements, including for example, improved security for the client system. For example, the dedicated data extraction computing device can extend the cloud system edge in to a client enterprises existing network and allow a client firewall to use existing security practices on the extracted data that is sent from the dedicated data extraction computing device. Firewall security operations such as SSL decryption, deep packet inspection and/or data loss prevention monitoring can be performed on the extracted data record stream. If a thin OS is used, a smaller code footprint can help reduce potential malware attacks. Other benefits will be recognized by those skilled in the art.

In some embodiments, the security engine provides initial security hardening for the thin OS of the data extraction appliance. The security engine can also be configured to provide one or more of continuous enforcement of the security hardening, automated remediation of security vulnerabilities, and audit and access logging. In some embodiments, the security engine does not require or rely on a centralized control plane or configuration management service external to the data extraction appliance.

In certain embodiments, one or more solutions rooted in computer technology overcome one or more problems specifically arising in the realm of computer technology. Some embodiments are directed to cloud-based computing platforms, such as data extraction and analytics systems including networking devices. In some examples, the devices in the network include virtual computing environments that employ an operating system and/or application for running one or more containers.

FIG. 1 illustrates an example data extraction system 100 in which the techniques described herein may be practiced, according to some embodiments. This diagram is merely an example, which should not unduly limit the scope of the claims. One of ordinary skill in the art would recognize many variations, alternatives, and modifications. In the example of FIG. 1, the data extraction system 100 is a computer system programmed to perform data extraction and is implemented across multiple computing devices. The components of FIG. 1 are implemented at least partially by hardware on computing devices such as one or more hardware processors executing stored program instructions stored in one or more memories for performing the functions that are described herein. In other words, all functions described herein are intended to indicate operations that are performed using hardware and programming in a special-purpose computer or general-purpose computer, in various embodiments. Data extraction system 100 illustrates only one of many possible arrangements of components configured to execute the programming described herein. Other arrangements may include fewer or different components, and the division of work between the components may vary depending on the arrangement.

The data extraction system 100 is configured to efficiently extract data from one or more client systems 102 and provide the extracted data to one or more data recipient systems 104. In one embodiment, the client system 102 and the data recipient system 104, such as a server system in a data analytics cloud computing platform, are different computers. Client system 102 also may be implemented across one or more computing devices and includes one or more data stores 106a-106n. The data stores 106a-106n are accessed through one or more client devices 108 such as one or more servers or other suitable devices.

The data extraction system 100 includes a dedicated data extraction computing device 110, such as a server, that is interposed between the client system 102 and one or more firewall devices 112 that form part of the client system security infrastructure. Data that is extracted from the data stores 106a-106n are communicated from the client system 102, to the dedicated data extraction computing device 110 and through the firewall device 112 to the data recipient system 104 through one or more networks 114, such as the internet, or any other suitable network. In some examples, once the dedicated extraction computing device 110 is installed, only one-way communications session initiation is allowed through the firewall. For example, the dedicated extraction computing device 110 provides extracted data and/or polling for job specifications as shown by arrows 116 and 118 through the firewall device 112 to the data recipient system 104. In certain implementations, new sessions are only allowed to be established in one direction, but return traffic related to an established data transfer session is permitted in the reverse direction. In this case, the device 110 is permitted to communicate outbound to establish a communications session through firewall 112 to recipient 104, and traffic related to that specific session from 104 is permitted back through firewall 112 to device 110.

The data stores 106a-106n serve as a data store for computer-implemented data records. The data record may include any computer-implemented data, such as a file, a data object, a database entry, a data message, or any other similar representation of computer-implemented data. The embodiments described herein do not require any particular type or format of the data records provided by a data store. Thus, a data store may include a file system, a relational database management system, a non-relational database, an object store, a distributed file system such as a Hadoop distributed file system, a Java Database Connectivity source, an email repository, data received through an application programming interface (API), a source code repository, a cloud-based data repository such as Amazon simple storage service, a message queue or any other repository or data store on one or more computing devices that contain data records. Each of the data stores 106a-106n may be implemented as a different type of data source. For example, in client system 102, one data store may be an Hadoop distributed files system (HDFS) data source, whereas data store 106n may be a relational database management system (RDBMS) data store or traditional file system data source. However, any suitable data source may be employed.

Figure 2:
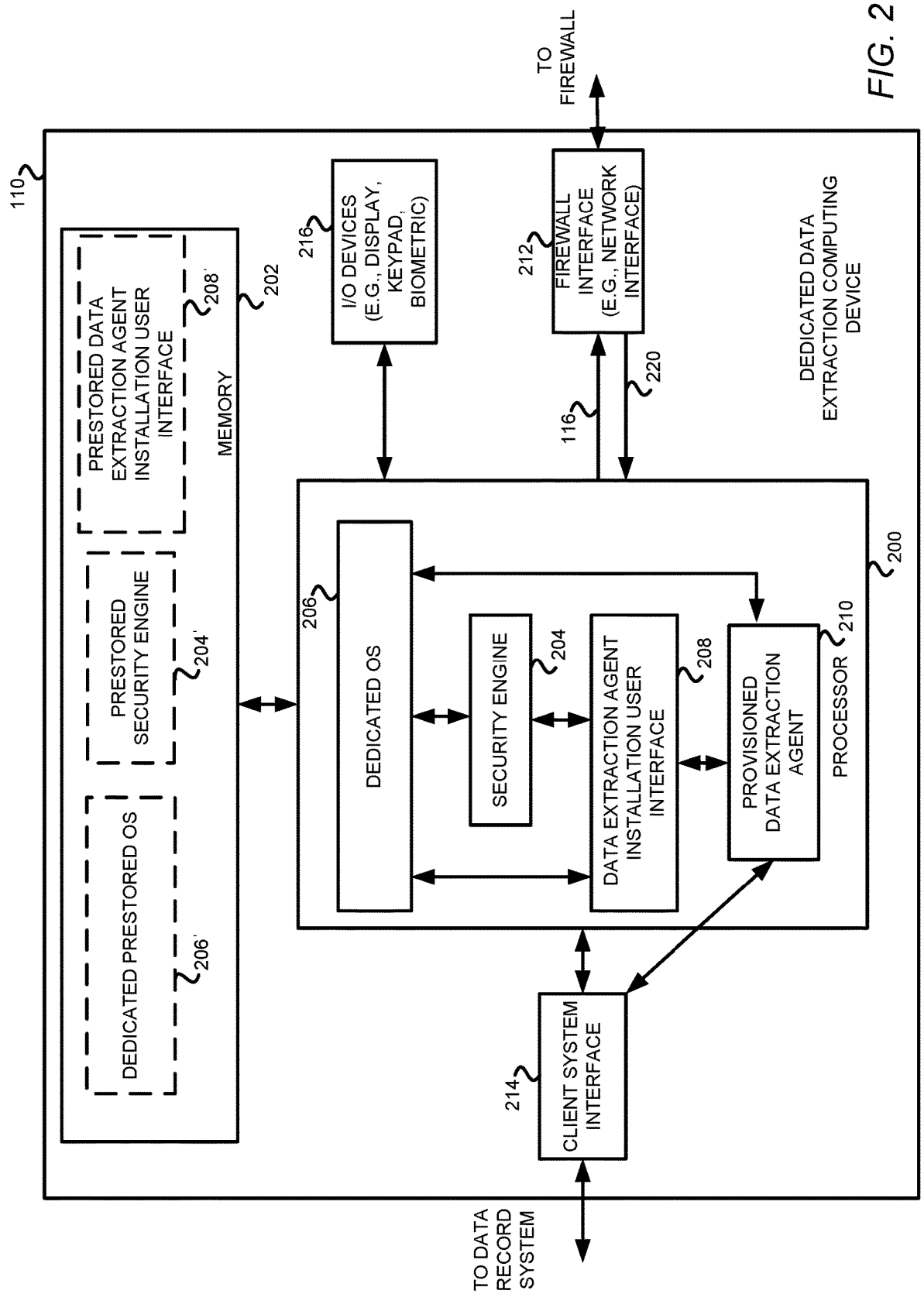
FIG. 2 is a block diagram illustrating a dedicated data extraction computing device in accordance with one example set forth in the disclosure.

Referring also to FIG. 2, in some examples, the dedicated data extraction computing device 110 is a dedicated piece of hardware that has a sealed housing and includes one or more processors 200 and memory 202 located inside the sealed housing. This diagram is merely an example, which should not unduly limit the scope of the claims. One of ordinary skill in the art would recognize many variations, alternatives, and modifications. The memory 202 stores instructions that when executed by the one or more processors 200, causes the one or more processors to carry out the operations as described herein. For example, the dedicated data extraction computing device 110 is configured to authenticate with the data recipient system 104 using a prestored security engine 204 and using a shared registration secret that uniquely associates the dedicated data extraction computing device 110 with the data recipient system 104. The dedicated data extraction computing device 110 retrieves an extraction job specification for a data extraction job, from an extraction job specification repository associated with the data recipient system 104. For example, a job coordinator of the data recipient system provides job specifications that are available for the dedicated data extraction computing device 110. Using the extraction job specification, the dedicated data extraction computing device 110 communicates to the client computing devices 108 associated with the client system 102 to extract data records from the one or more data stores 106a-106n. The dedicated data extraction dedicated data extraction computing device 110 receives extracted data records from the one or more client computing devices 108 and sends the received extracted data records to the data recipient system 104 through the firewall device 112.

As further illustrated in FIG. 2, the dedicated extraction computing device 110 includes a prestored operating system 206' that is pre-configured to support a data extraction agent once it is sent from the data recipient system 104. The dedicated data extraction computing device 110 includes a prestored security engine 204', as well as a prestored data extraction agent installation user interface 208' which are stored in memory 202 at the time the dedicated extraction computing device 110 is shipped for placement between the firewall device and the client device 108. The processor 200 executes the stored instructions corresponding to the prestored OS 206', the prestored security engine 204' and the prestored data extraction agent installation user interface 208' to affect a dedicated OS 206, a security engine 204 and a data extraction agent installation user interface 208. As further described below, a data extraction agent 210 is sent from the data recipient system 104 in a secure manner after setup and registration of the dedicated extraction computing device 110 with the data recipient system 104. The dedicated OS 206, security engine 204, data extraction agent installation user interface 208 are in communication with each other as needed to carry out the operations described herein. The prestored operating system 206', prestored security engine 204' and prestored data extraction agent installation user interface 208' are program modules of stored executable instructions in memory 202.

The data extraction agent 210 uses any configuration files, packages or libraries specified in the extraction job specification to extract data records from the data sources. For example, the data extraction agent may use a JAR, DLL, device driver, or other package or library specified in the extraction job specification to perform the extraction from the data source. In one example, the data extraction agent may run a regular expression or SQL query against extracted data records or may group certain data records together into a single transaction. However, such operations need not be employed. In some examples, the data extraction agent may include metadata regarding the extracted data records, such as data source identifiers, a timestamp of extraction, details regarding one or more inline processors that were applied to the data extracted records, error codes, runtime exceptions that occurred during data extraction, an identifier of the data recipient user for the extracted data records, or any suitable metadata.

The dedicated extraction computing device 110 also includes a firewall interface 212 to interface with the firewall device 112 and may include, for example, an ethernet interface, or any other suitable interface. The dedicated extraction computing device 110 also includes a client system interface 214 that allows the dedicated extraction computing device 110 to communicate with the client devices 108 and may be, for example, an ethernet interface, or another interface. The interfaces can provide secure socket layer (SSL) communication or any other suitable protocol that provides secure communication with the client system and the firewall. The dedicated extraction computing device 110 if desired may also include input/output devices generally shown as 216 such as one or more displays, keypad or other mechanism to allow a user to receive and provide information through the user interface through a displayed graphic user interface or other type of user interface.

The dedicated extraction computing device 110 in some examples is installed at the client data center as a separate hardware server device. For example, the dedicated data extraction computing device 110 is installed in rails in a server rack and connected to the firewall device 112 and the client devices 108 through ethernet connections or any other suitable connections via the appropriate interface ports.

Figure 3:
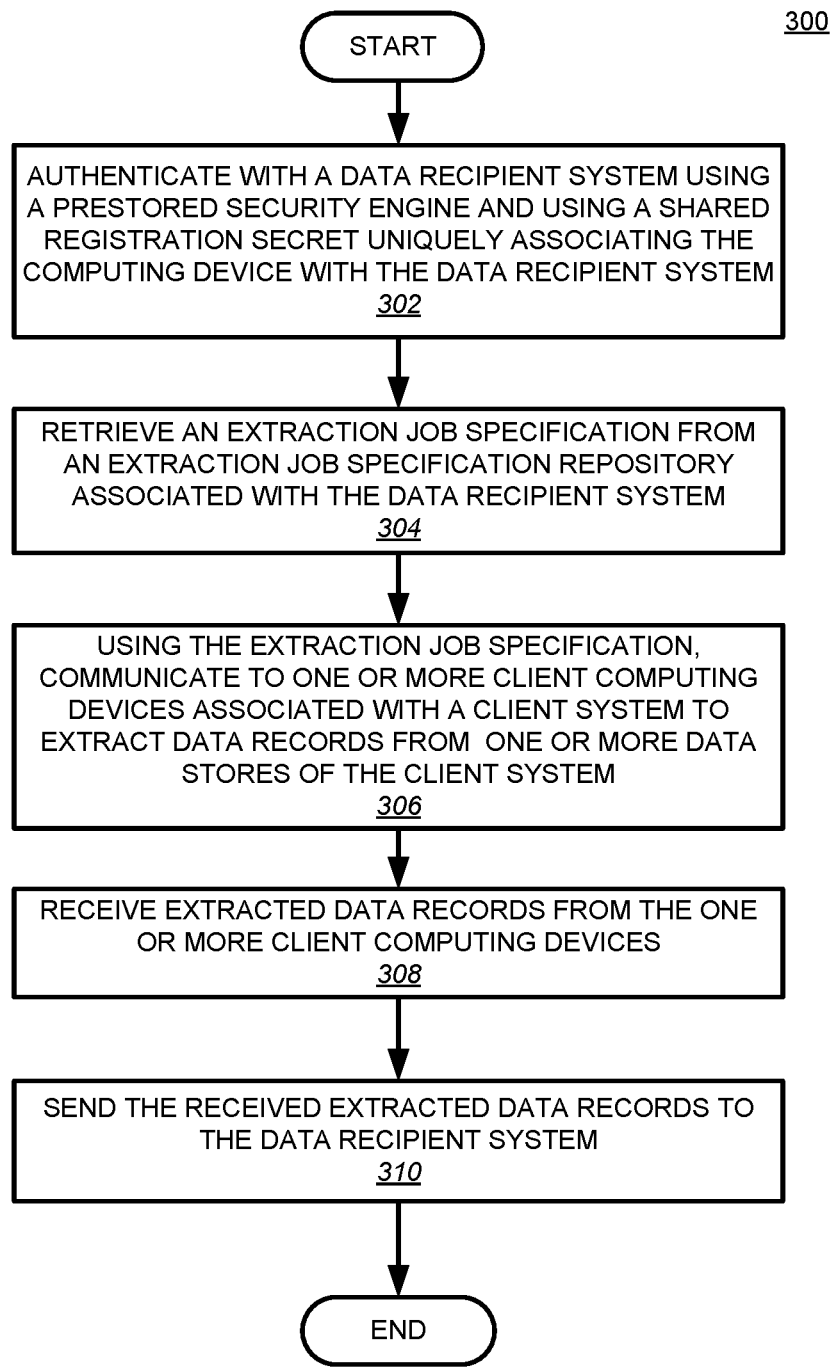
FIG. 3 is a flow chart illustrating a method for conducting data extraction from one or more data stores associated with a client system in accordance with one example set forth in the disclosure.

FIG. 3 illustrates one example of a method for conducting data extraction from one or more data sources associated with a client system 102. This diagram is merely an example, which should not unduly limit the scope of the claims. One of ordinary skill in the art would recognize many variations, alternatives, and modifications. The method 300, in one example, is carried out by the dedicated data extraction computing device 110. As shown in block 302, the method includes authenticating with the data recipient system 104 using the prestored security engine 204' that has been loaded and is executing shown as the security engine 204 and using a shared registration secret key that uniquely associates the dedicated extraction computing device 110 with the data recipient system 104. The shared registration secret key, in one example is a random short-term secret key generated by the data recipient system 104 upon request by an administrator prior to the dedicated data extraction computing device 110 being sent for installation. The shared secret key may have a limited lifetime associated with it (e.g., hours) and may be provided via an out of band communication such as a telephone call, email or other suitable secure mechanism, with an installer of the dedicated extraction computing device 110. The data recipient system 104 for example uses a security system (not shown) to generate a random shared key that uniquely binds the dedicated data extraction computing device 110 with the data extraction agent 210 using shared key generation and binding techniques. The data extraction agent installation user interface 208 presents a user interface that allows entry of the shared secret key once the dedicated extraction computing device 110 has been setup. In some embodiments, the security engine provides initial security hardening for the thin OS of the data extraction appliance. The security engine can also be configured to provide one or more of continuous enforcement of the security hardening, automated remediation of security vulnerabilities, and audit and access logging. In some embodiments, the security engine does not require or rely on a centralized control plane or configuration management service external to the data extraction appliance.

As shown in block 304, the method includes retrieving an extraction job specification from an extraction job specification repository associated with the data recipient system 104. This may be performed, in one example, by the data extraction agent 210 polling the data recipient system 104 after the dedicated extraction computing device 110 has been registered and the data extraction agent 210 has been provisioned from the data recipient system 104 to the dedicated extraction computing device 110. The data recipient system 104 includes a data extraction job coordinator that maintains a list of jobs for the dedicated extraction computing device 110. The data extraction agent 210 polls the job coordinator and when an extraction job specification has been found, carries out the job specification to extract data from the data stores 106a-106n.

As shown in block 306, the method includes using the extraction job specification and communicating to the one or more client computing devices 108 to extract data records from the one or more data stores 106a-106n to affect the job specification. As shown in block 308, the method includes receiving the extracted data records from the computing devices 108 through communication link 120 for transport to the data recipient system 104. As shown in block 310, the method includes sending the received extracted data records to the data recipient system 104 for processing. The data recipient system 104 may store the stream of data records and/or process the stream of data records.

For example, the data recipient system 104 can also include a data record transformer. A "data record transformer" may be a subsystem that is programmed or configured for processing and/or manipulating data records received from one or more data extraction agents that are communicatively coupled to the data record transformer. For example, in data extraction system 100, data record transformer is communicatively coupled to data extraction agent 210 through the firewall. The data extraction agent 210 is programmed or configured to transmit a transaction containing extracted data records collected from data sources 106 to the data record transformer. In one embodiment, data record transformer is programmed or configured to transform the extracted data records by applying one or more algorithms or data manipulation operations to the extracted data records. In one embodiment, the data manipulation operations applied by the data record transformer includes business logic for manipulating the extracted data records. For example, in one embodiment, the data record transformer creates transformed data as the result of transforming the extracted data records. In one embodiment, a data record transformer is programmed or configured for storing data in a data storage device coupled to data recipient system 104 (not depicted) related to the extracted data records. The stored data could be the original extracted data records as received from data extraction agent(s) 210 in the dedicated data extraction computing device 110, or the transformed data.

The data recipient system 104 may optionally include a data record consumer. A "data record consumer" may be a subsystem that consumes data received from data record transformer. A data record consumer may be communicatively coupled to the data record transformer. In one embodiment, data record consumer is programmed or configured to interoperate with a client computer to view the contents of the data records or the transformed data after processing by data record transformer.

In one embodiment, data extraction agent 210 is communicatively coupled to an extraction job specification repository and/or job coordinator of the data recipient system 104. An extraction job specification repository is a repository that stores one or more extraction job specifications. An extraction job specification includes one or more configuration files that provide configuration details describing how to extract data records from a data source. Thus, an extraction job specification can be used by data extraction agent 210 to perform data extraction from data sources 106a-106n. The extraction job specification repository can be communicatively coupled to client system 102 and/or data recipient system 104. In one embodiment, the extraction job specification repository is a part of client system 102. In another embodiment, the extraction job specification repository is a part of the data recipient system 104. In yet another embodiment, the extraction job specification repository is implemented as its own system, separate from client system 102 and/or server system 104. In one embodiment, data recipient system 104 includes a job coordinator. The job coordinator may be responsible for managing the extraction job specification repository.

In some examples, an extraction job specification includes one or more configuration files that provide configuration details for how to extract data records from a data source. In one embodiment, an extraction job specification can be implemented in any markup language or data format syntax, such as extensible markup language (XML), "YAML Ain't Markup Language" (YAML), or JavaScript Object Notation (JSON), and is stored in the form of digital data in a storage device or digital memory.

Figure 4:
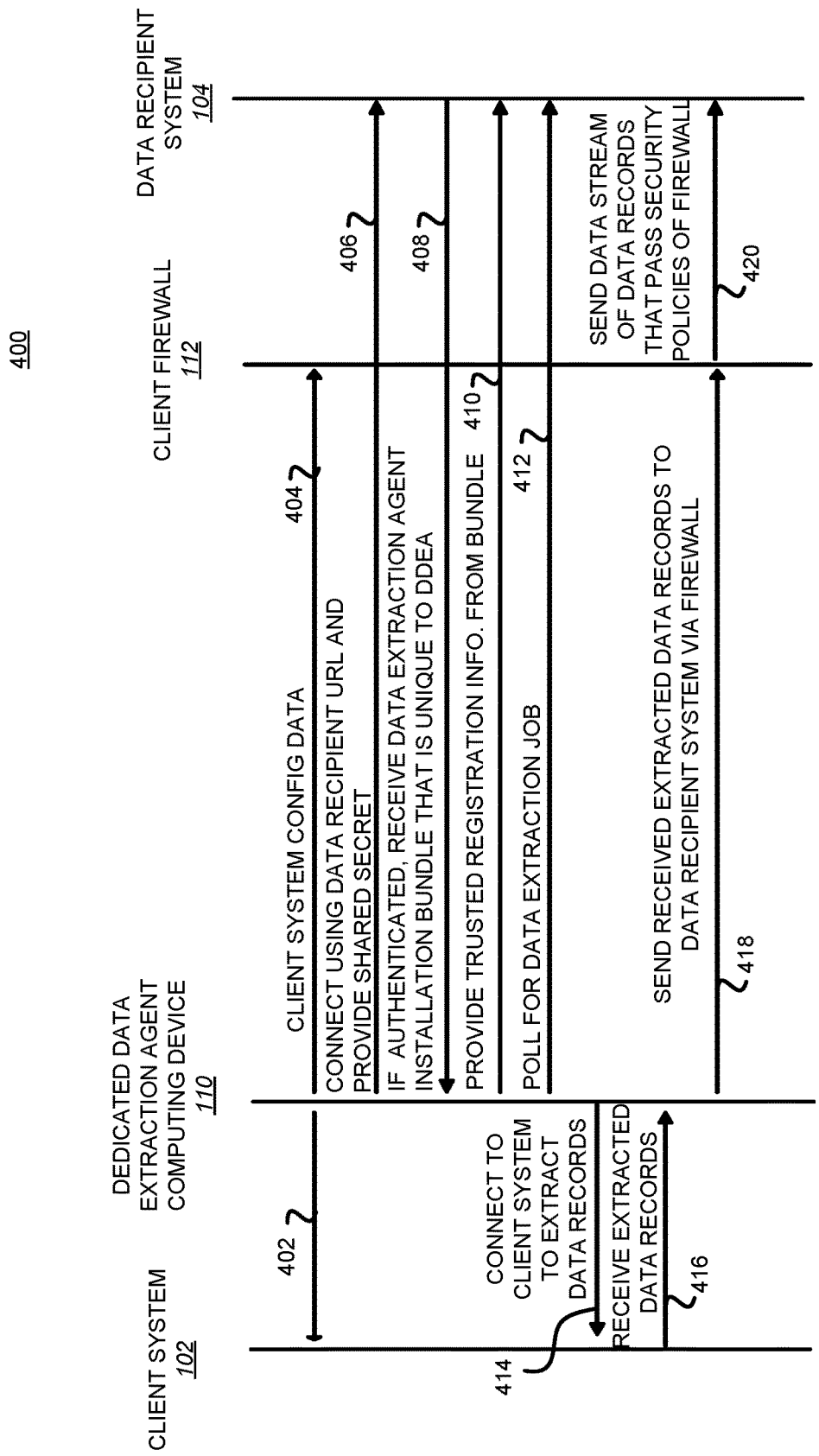
FIG. 4 is a diagram illustrating communication information in a data extraction system in accordance with one example set forth in the disclosure.

FIG. 4 is a diagram illustrating communication information amongst the components of the data extraction system 100 according to one example set forth in the disclosure. This diagram is merely an example, which should not unduly limit the scope of the claims. One of ordinary skill in the art would recognize many variations, alternatives, and modifications. In some examples, the data extraction agent installation user interface 208 provides a graphic user interface that, in one example, presents fields on screen for receiving login information, network configuration information and post registration control for a client administrator (e.g., to stop data extraction from a particular source or to offline the dedicated data extraction computing device 110). In one example, the data extraction agent installation user interface 208 provides a login interface to allow an administrator to login and upon successful login, allows the administrator to configure the dedicated extraction computing device 110 for communication with the client system 102 and the data recipient system 104. For example, after user login occurs, the data extraction agent installation user interface 208 provides an interface to allow a network configuration process to occur such as through menu options to set appropriate network IP addresses, subnets, gateway (firewall) connections, DNS server connections, NTP server connections or any other suitable network configuration information. This is shown by communications 402 and 404.

As shown by communication 406, the dedicated extraction computing device 110 is registered from a menu provided by the data extraction agent installation user interface 208. In one example, the user interface presents a menu and fields to allow an administrator to enter a data recipient system URL and the shared secret. The data recipient system 104 which also has a copy of the shared secret, authenticates the dedicated extraction computing device 110 by matching the stored shared secret with the received shared secret from communication 406. If a match occurs, authentication is granted for the dedicated extraction computing device 110. As such, the dedicated data extraction computing device 110 connects with the data recipient system 104 and if authentication is granted, as shown by communication 408, the dedicated data extraction computing device 110 receives, in response to the authentication, a data extraction agent installation bundle shown as 220 (FIG. 2) which contains the provisioned data extraction agent 210. The bundle 220 also includes not only the data extraction agent 210, but also associated trust verification data, such as certificates or other security information unique to the data extraction agent 210 so that the data extraction agent 210 can be verified by the dedicated data extraction computing device using security engine 204. For example, the dedicated data extraction computing device 110 unbundles the received bundle 220 to load the data extraction agent 210 after verification of the trust verification data (e.g., PKI certificate information) by the security engine 204 so that the dedicated data extraction computing device 110 trusts that the provisioned data extraction agent 210 came from a trusted source. In one example as shown in communication 410, the dedicated extraction computing device 110 provides signed information or a returned certificate that was coupled with the bundle to the data recipient system 104. The data recipient system 104 verifies the security information from the dedicated extraction computing device 110 and if verified, allows access to the data recipient system for the dedicated extraction computing device 110. In other examples, the dedicated data extraction computing device 110 self verifies that the bundle is trusted without sending providing signed information or returned certificate back to the data recipient system 104. In other embodiments, the data extraction agent installation user interface in conjunction with the security engine installs the data extraction agent from the bundle and communicates the trust verification data from the bundle to the data recipient system 104 using the installed data extraction agent 210 to complete registration. The certificates embedded in the bundle from the data recipient unit 104 are used by the security engine 204 so that the trust verification data is used to verify that the received data extraction agent installation bundle is from the data recipient system 104. In this way, a unique identity is provided for the bundle so that only the dedicated extraction computing device 110 is able to use the data extraction agent 210 from the bundle 220. In some examples, the received bundle 220 and components thereof and other processes in the dedicated data extraction computing device 110 are configured in a containerized structure to affect running of the data extraction agent 210 in a virtual environment in the dedicated extraction computing device 110. However, any suitable architecture may be employed.

As also shown in FIG. 4, if a data extraction job has been detected by the dedicated extraction computing device 110, a connection to the client system 108 is carried out as shown in communication 414 and a request for the extraction of data records is made to the client system 102. The client system 102 carries out the request and provides extracted data records back to the dedicated data extraction computing device 110 as shown by communication 416. The extracted data records are then sent, as shown in communication 418, to the recipient system through the firewall device 112. The firewall device 112 may carry out the conventional security policies on a stream of extracted data records and send the data records that pass the security policies of the firewall to the data recipient system 104 as shown by communication 420.

In some implementations, the data recipient system 104 generates the data extraction installation bundle 220 and corresponding registration secret in response to a request from the client system, such as through a client administrator. In certain implementations, after the dedicated data extraction computing device 110 has been verified with the shared secret and the data extraction agent 210 is installed from the bundle, the client system 102 configures data sources 106a-106n within the client system to make them available to analytics users of the data recipient system 104. A user of the analytics system defines the job specification and schedule it in the job scheduler. The dedicated data extraction computing device 110 polls for the job and once found extracts data records via SSL links from the client system 102 and sends them to the firewall via an SSL connection. The firewall 112 performs SSL decryption, deep packet inspection and/or data loss prevention monitoring and sends the security processed data records to the data recipient system via an SSL connection. However, this is just one example and any suitable variations can be employed.

In some implementations the dedicated data extraction computing device 110 performs self-monitoring and telemetry and reports data back to the data recipient system 104 for central monitoring by data recipient system 104. For example, the dedicated data extraction computing device 110 tracks outages and other errors and pushes them to the data recipient unit 104. In some implementations the dedicated data extraction computing device 110 is preconfigured to run the data extraction agent in a virtual environment via a containerized approach to improve survivability and recovery.

Figure 5:
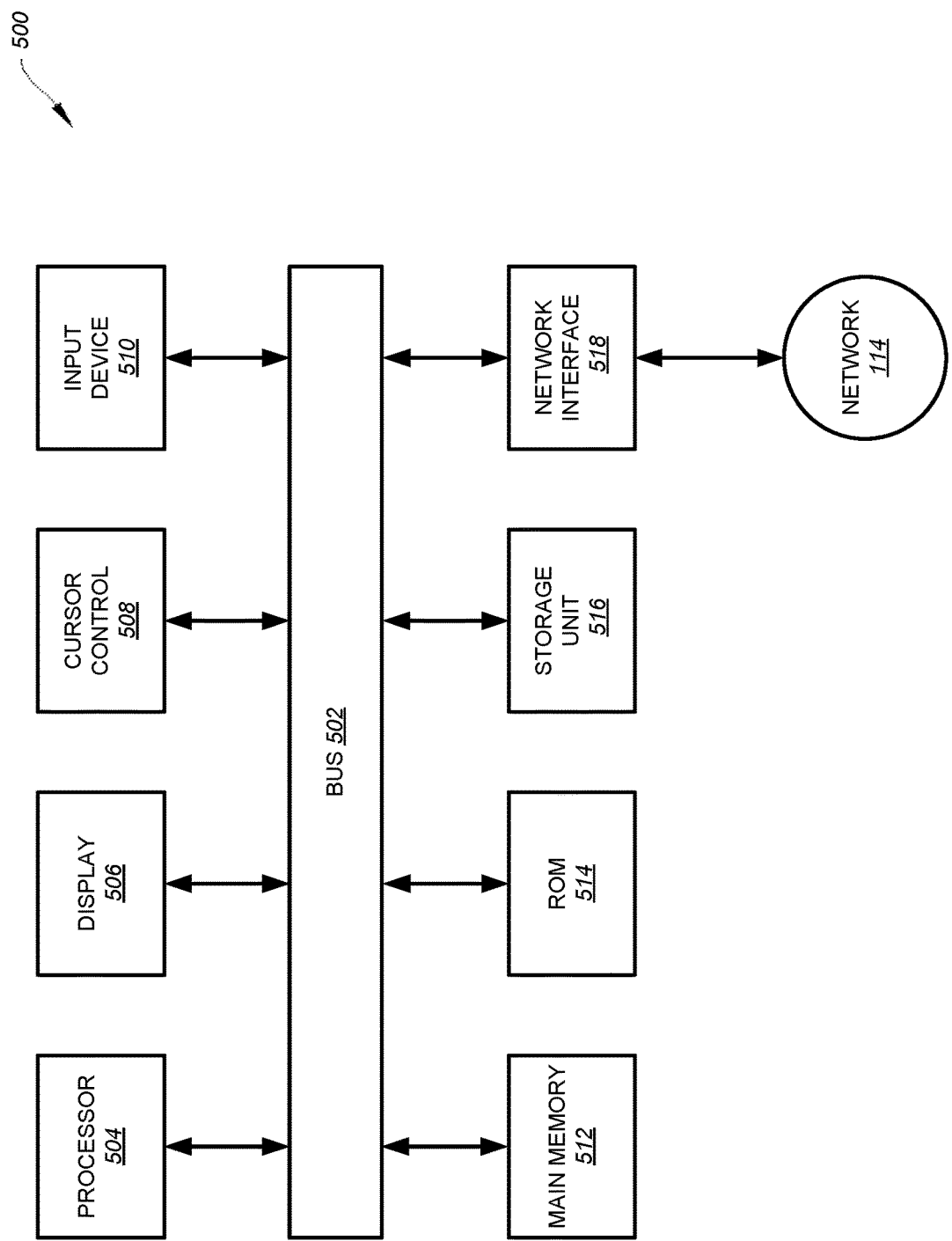
FIG. 5 is a simplified diagram showing a computing system for conducting data extraction from one or more data stores in accordance with one example set forth in the disclosure.

FIG. 5 is a simplified diagram showing a computing system for implementing a dedicated data extraction computing device and/or a client device and/or a data recipient device. However, any suitable structure may be employed. This diagram is merely an example, which should not unduly limit the scope of the claims. One of ordinary skill in the art would recognize many variations, alternatives, and modifications. The computing system 500 includes a bus 502 or other communication mechanism for communicating information, a processor 504, a display 506, a cursor control component 508, an input device 510, a main memory 512, a read only memory (ROM) 514, a storage unit 516, and a network interface 518. In some embodiments, some or all processes (e.g., steps) of the method 400, the method 500, and/or the method 600 are performed by the computing system 500. In some examples, the bus 502 is coupled to the processor 504, the display 506, the cursor control component 507, the input device 510, the main memory 512, the read only memory (ROM) 514, the storage unit 516, and/or the network interface 518. In certain examples, the network interface is coupled to a network 114. For example, the processor 504 includes one or more general purpose microprocessors. In some examples, the main memory 512 (e.g., random access memory (RAM), cache and/or other dynamic storage devices) is configured to store information and instructions to be executed by the processor 504. In certain examples, the main memory 512 is configured to store temporary variables or other intermediate information during execution of instructions to be executed by processor 504. For examples, the instructions, when stored in the storage unit 516 accessible to processor 504, render the computing system 500 into a special-purpose machine that is customized to perform the operations specified in the instructions. In some examples, the ROM 514 is configured to store static information and instructions for the processor 504. In certain examples, the storage unit 516 (e.g., a magnetic disk, optical disk, or flash drive) is configured to store information and instructions.

In some embodiments, the display 506 (e.g., a cathode ray tube (CRT), an LCD display, or a touch screen) is configured to display information to a user of the computing system 500. In some examples, the input device 510 (e.g., alphanumeric and other keys) is configured to communicate information and commands to the processor 504. For example, the cursor control 508 (e.g., a mouse, a trackball, or cursor direction keys) is configured to communicate additional information and commands (e.g., to control cursor movements on the display 506) to the processor 504.

According to some embodiments, a computing device includes a sealed housing and one or more processors and memory located inside the sealed housing. The memory stores instructions that when executed by the one or more processors causes the one or more processors to authenticate with a data recipient system using a prestored security engine and using a shared registration secret uniquely associating the computing device with the data recipient system. The one or more processors retrieve an extraction job specification from an extraction job specification repository associated with the data recipient system and using the extraction job specification, communicate to one or more client computing devices associated with a client system to extract data records from one or more data stores of the client system. The one or more processors receives extracted data records from the one or more client computing devices; and sends the received extracted data records to the data recipient system. For example, the device is implemented according to at least FIG. 1, FIG. 2, FIG. 3, FIG. 4, and/or FIG. 5.

In some examples, the memory comprises the prestored security engine, a prestored operating system and a prestored data extraction agent installation interface, that when executed, causes the one or more processors to connect the dedicated data extraction computing device to the data recipient system; receive, in response to the authentication, a data extraction agent installation bundle that is unique to the computing device, wherein the bundle comprises at least the data extraction agent and associated trust verification data; install, the data extraction agent from the bundle; and communicate the trust verification data from the bundle to the data recipient system using the installed data extraction agent to complete registration.

In certain examples, the memory comprises executable instructions that when executed by the one or more processors causes the one or more processors to use the trust verification data to verify that the received data extraction agent installation bundle is from the data recipient system. In some examples, the memory comprises executable instructions that when executed by the one or more processors causes the one or more processors to provide a user interface that provides control of data extraction stoppage of client data stores.

In some examples, the memory comprises executable instructions that when executed by the one or more processors causes the one or more processors to provides self-monitoring data back to the data recipient system for central monitoring by data recipient system.

In certain examples, the memory comprises executable instructions that when executed by the one or more processors causes the one or more processors to run the data extraction agent in a virtual environment via a containerized structure.

In other examples, a method for conducting data extraction from one or more data stores associated with a client system includes authenticating with a data recipient system using a prestored security engine in a dedicated data extraction computing device and using a shared registration secret uniquely associating the dedicated data extraction computing device with the data recipient system; retrieving, by the dedicated data extraction computing device, an extraction job specification from an extraction job specification repository associated with the data recipient system; using the extraction job specification, communicating by the dedicated data extraction computing device, to one or more client computing devices associated with the client system to extract data records from the one or more data stores; receiving, by the dedicated data extraction computing device, extracted data records from the one or more client computing devices; sending, by the dedicated data extraction computing device, the received extracted data records to the data recipient system, wherein the method is performed using one or more processors of the dedicated data extraction computing device. For example, the method is implemented according to at least FIG. 1, FIG. 2, FIG. 3, FIG. 4, and/or FIG. 5.

In certain examples, the method includes connecting the dedicated data extraction computing device to the data recipient system; receiving, in response to the authentication, a data extraction agent installation bundle that is unique to the dedicated data extraction computing device, wherein the bundle comprises at least the data extraction agent and associated trust verification data; installing, the data extraction agent from the bundle; and communicating the trust verification data from the bundle to the data recipient system using the installed data extraction agent to complete registration.

In some examples, the method includes providing a user interface that provides control of data extraction stoppage of client data stores. In certain examples, the method includes providing self-monitoring data back to the data recipient system for central monitoring by data recipient system. In some examples, the method includes running the data extraction agent in a virtual environment via a containerized structure.

In yet other examples, a system includes a device comprising a sealed housing; and one or more processors and memory located inside the sealed housing, the memory storing instructions that when executed by the one or more processors causes the one or more processors to: use a prestored operating system (OS) resident on the computing device to employ a prestored data extraction agent installation interface to configure a data extraction agent, the data extraction agent operative to: securely interface with one or more client computing devices in a client system and interface with a firewall device in the client system; poll for one or more data extraction jobs from the data recipient system through the firewall device; in response to polling for the one or more data extraction jobs from the data recipient system, extract data from one or more data stores of the client system; and provide the extracted data obtained from the client system to the data recipient system through the firewall device. For example, the system is implemented according to at least FIG. 1, FIG. 2, FIG. 3, FIG. 4, and/or FIG. 5.

In certain examples, the device comprises a client system interface operative to allow the data extraction agent to securely interface with the one or more client computing devices; and a firewall interface operative to allow the data extraction agent to poll for one or more data extraction jobs from the data recipient system and provide the extracted data.

In some examples the one or more processors of the system are configured to: connect the dedicated data extraction computing device to a data recipient system; authenticate with the data recipient system using a prestored security engine in the device and using a shared registration secret uniquely associating the device with the data recipient system; receive, in response to the authentication, a data extraction agent installation bundle that is unique to the device, wherein the bundle comprises at least the data extraction agent and associated trust verification data; install, the data extraction agent from the bundle; and communicate the trust verification data from the bundle to the data recipient system using the installed data extraction agent to complete registration.

In certain examples, the system includes memory that comprises executable instructions that when executed by the one or more processors causes the one or more processors to provide a user interface that provides control of data extraction stoppage of client data stores. In some examples, the memory comprises executable instructions that when executed by the one or more processors causes the one or more processors to provide self-monitoring data back to the data recipient system for central monitoring by data recipient system. In certain examples, the memory comprises executable instructions that when executed by the one or more processors causes the one or more processors to run the data extraction agent in a virtual environment via a containerized structure.

In some examples, the data recipient system is configured to generate the shared registration secret for the device and to authenticate the device as a trusted device, using the shared registration secret that uniquely associates the device with the data recipient system.

In certain examples, the data recipient system is configured to provide the data extraction agent installation bundle that is unique to the device, wherein the bundle comprises at least the data extraction agent and associated trust verification data. In some examples, the device is configured to use the trust verification data to verify that the received data extraction agent installation bundle is from the data recipient system. In certain examples, memory in a data recipient system comprises executable instructions that when executed by one or more processors causes the one or more processors to trigger and remotely upgrade the data extraction agent with a signed version of the upgrade. The computing device polls for upgrade information and when detected requests the upgrade. The computing device then performs a cryptographic verification of the signature and installs the received upgrade if verification is successful.

In certain examples, a method for conducting data extraction from one or more data stores associated with a client system comprising: connecting a dedicated data extraction computing device to a data recipient system; authenticating, by the dedicated data extraction computing device, with the data recipient system using a prestored security engine in the dedicated data extraction computing device and a shared registration secret uniquely associating the dedicated data extraction computing device with the data recipient system; receiving by the dedicated data extraction computing device, in response to the authentication, a data extraction agent installation bundle that is unique to the device, wherein the bundle comprises at least a data extraction agent and associated trust verification data; installing, by the dedicated data extraction computing device, the data extraction agent from the bundle; communicating the trust verification data from the bundle to the data recipient system, by the dedicated data extraction computing device, using the installed data extraction agent to complete registration; polling, from the data recipient system, for one or more data extraction job transactions associated with the one or more data stores of the client system, by the dedicated data extraction computing device; and extracting data from the one or more data stores, by the dedicated data extraction computing device, in response to polling for the one or more data extraction job transactions from the data recipient system, by sending one or more requests to the external client system. The method is performed using one or more processors. For example, the method is implemented according to at least FIG. 1, FIG. 2, FIG. 3, FIG. 4 and FIG. 5.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations, one or more features from a combination can in some cases be removed from the combination, and a combination may, for example, be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computing device comprising:
   one or more processors and memory, the memory storing instructions that when executed by the one or more processors causes the one or more processors to:
   authenticate with a data recipient system using a prestored security engine and using a shared registration secret uniquely associating the computing device with the data recipient system;
   in response to the authentication, receiving an installation bundle, the installation bundle comprising a data extraction agent and associated trust verification data unique to the data extraction agent;
   unbundling the received installation bundle to load the data extraction agent, after verification of the associated trust verification data using the prestored security engine, wherein the trust verification data comprises a returned certificate;
   retrieve an extraction job specification, for the data extraction agent, from an extraction job specification repository associated with the data recipient system;
   using the extraction job specification, communicate to one or more client computing devices associated with a client system to extract data records from one or more data stores of the client system;
   receive extracted data records from the one or more client computing devices; and
   send the received extracted data records to the data recipient system, through a secure socket layer (SSL) connection with a firewall device configured to perform SSL decryption on the extracted data.

2. The computing device of claim 1 wherein the memory comprises the prestored security engine, a prestored operating system and a prestored data extraction agent installation interface, that when executed, causes the one or more processors to:
   connect the dedicated data extraction computing device to the data recipient system;
   receive, in response to the authentication, a data extraction agent installation bundle that is unique to the computing device, wherein the bundle comprises at least the data extraction agent and associated trust verification data;
   install, the data extraction agent from the bundle; and communicate the trust verification data from the bundle to the data recipient system using the installed data extraction agent to complete registration.

3. The computing device of claim 2 wherein the memory comprises executable instructions that when executed by the one or more processors causes the one or more processors to use the trust verification data to verify that the received data extraction agent installation bundle is from the data recipient system.

4. The computing device of claim 1 wherein the memory comprises executable instructions that when executed by the one or more processors causes the one or more processors to provide a user interface that provides control of data extraction stoppage of client data stores.

5. The computing device of claim 1 wherein the memory comprises executable instructions that when executed by the one or more processors causes the one or more processors to provides self-monitoring data back to the data recipient system for central monitoring by data recipient system.

6. The computing device of claim 1 wherein the memory comprises executable instructions that when executed by the one or more processors causes the one or more processors to run the data extraction agent in a virtual environment via a containerized structure.

7. A method for conducting data extraction from one or more data stores associated with a client system comprising:
authenticating with a data recipient system using a prestored security engine in a dedicated data extraction computing device and using a shared registration secret uniquely associating the dedicated data extraction computing device with the data recipient system;
in response to the authentication, receiving an installation bundle, the installation bundle comprising a data extraction agent and associated trust verification data unique to the data extraction agent;
unbundling the received installation bundle to load the data extraction agent, after verification of the associated trust verification data using the prestored security engine, wherein the trust verification data comprises a returned certificate;
retrieving, by the dedicated data extraction computing device, an extraction job specification, for the data extraction agent, from an extraction job specification repository associated with the data recipient system;
using the extraction job specification, communicating by the dedicated data extraction computing device, to one or more client computing devices associated with the client system to extract data records from the one or more data stores;
receiving, by the dedicated data extraction computing device, extracted data records from the one or more client computing devices;
sending, by the dedicated data extraction computing device, the received extracted data records to the data recipient system, through a secure socket layer (SSL) connection with a firewall device configured to perform SSL decryption on the extracted data,
wherein the method is performed using one or more processors of the dedicated data extraction computing device.

8. The method of claim 7 comprising:
connecting the dedicated data extraction computing device to the data recipient system;
receiving, in response to the authentication, a data extraction agent installation bundle that is unique to the dedicated data extraction computing device, wherein the bundle comprises at least the data extraction agent and associated trust verification data;
installing, the data extraction agent from the bundle; and
communicating the trust verification data from the bundle to the data recipient system using the installed data extraction agent to complete registration.

9. The method of claim 7 further comprising providing a user interface that provides control of data extraction stoppage of client data stores.

10. The method of claim 7 further comprising providing self-monitoring data back to the data recipient system for central monitoring by data recipient system.

11. The method of claim 7 comprising running the data extraction agent in a virtual environment via a containerized structure.

12. A system comprising:
one or more processors and memory, the memory storing instructions that when executed by the one or more processors causes the one or more processors to:
receive an installation bundle, the installation bundle comprising a data extraction agent and associated trust verification data unique to the data extraction agent;
unbundle the received installation bundle to load the data extraction agent, after verification of the associated trust verification data, wherein the trust verification data comprises a returned certificate;
use a prestored operating system (OS) resident on the device to employ a prestored data extraction agent installation interface to configure a data extraction agent, the data extraction agent operative to:
securely interface with one or more client computing devices in a client system and interface with a firewall device in the client system;
poll for one or more data extraction jobs from a data recipient system through the firewall device;
in response to polling for the one or more data extraction jobs from the data recipient system, extract data from one or more data stores of the client system; and
provide the extracted data obtained from the client system to the data recipient system through a secure socket layer (SSL) connection with the firewall device, wherein the firewall device is configured to perform SSL decryption on the extracted data.

13. The system of claim 12 wherein the device comprises:
a client system interface operative to allow the data extraction agent to securely interface with the one or more client computing devices; and
a firewall interface operative to allow the data extraction agent to poll for one or more data extraction jobs from the data recipient system and provide the extracted data.

14. The system of claim 13 wherein the one or more processors are configured to:
connect the dedicated data extraction computing device to a data recipient system;
authenticate with the data recipient system using a prestored security engine in the device and using a shared registration secret uniquely associating the device with the data recipient system;
receive, in response to the authentication, a data extraction agent installation bundle that is unique to the device, wherein the bundle comprises at least the data extraction agent and associated trust verification data;
install, the data extraction agent from the bundle; and communicate the trust verification data from the bundle to the data recipient system using the installed data extraction agent to complete registration.

15. The system of claim 13 wherein the memory comprises executable instructions that when executed by the one or more processors causes the one or more processors to provide a user interface that provides control of data extraction stoppage of client data stores.

16. The system of claim 13 wherein the memory comprises executable instructions that when executed by the one or more processors causes the one or more processors to provide self-monitoring data back to the data recipient system for central monitoring by data recipient system.

17. The system of claim 12 wherein the memory comprises executable instructions that when executed by the one or more processors causes the one or more processors to run the data extraction agent in a virtual environment via a containerized structure.

18. The system of claim 14 wherein the data recipient system is configured to generate the shared registration secret for the device and to authenticate the device as a trusted device, using the shared registration secret that uniquely associates the device with the data recipient system.

19. The system of claim 18 wherein the data recipient system is configured to provide the data extraction agent installation bundle that is unique to the device, wherein the bundle comprises at least the data extraction agent and associated trust verification data.

20. The system of claim 19 wherein the device is configured to use the trust verification data to verify that the received data extraction agent installation bundle is from the data recipient system.

* * * * *